United States Patent
Li et al.

(10) Patent No.: US 12,243,281 B2
(45) Date of Patent: Mar. 4, 2025

(54) SYSTEM, AN ARRANGEMENT, A COMPUTER SOFTWARE MODULE ARRANGEMENT, A CIRCUITRY ARRANGEMENT AND A METHOD FOR IMPROVED IMAGE PROCESSING UTILIZING TWO ENTITIES

(71) Applicant: Telefonaktiebolaget LM Ericsson (publ), Stockholm (SE)

(72) Inventors: Yun Li, Lund (SE); Fredrik Dahlgren, Lund (SE); Héctor Caltenco, Oxie (SE); Alexander Hunt, Tygelsjö (SE); Saeed Bastani, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 376 days.

(21) Appl. No.: 17/802,451

(22) PCT Filed: Mar. 3, 2020

(86) PCT No.: PCT/EP2020/055525
§ 371 (c)(1),
(2) Date: Aug. 25, 2022

(87) PCT Pub. No.: WO2021/175413
PCT Pub. Date: Sep. 10, 2021

(65) Prior Publication Data
US 2023/0100728 A1    Mar. 30, 2023

(51) Int. Cl.
*G06V 10/20* (2022.01)
*G06T 7/11* (2017.01)
(Continued)

(52) U.S. Cl.
CPC .............. *G06V 10/20* (2022.01); *G06T 7/11* (2017.01); *G06T 9/002* (2013.01); *G06V 10/96* (2022.01);
(Continued)

(58) Field of Classification Search
CPC ...... G06V 10/96; G06V 10/70; G06V 10/764; G06T 9/002; G06T 2207/20081; G06T 2207/20084; G06N 20/20
See application file for complete search history.

(56) References Cited

U.S. PATENT DOCUMENTS

| 10,984,560 B1* | 4/2021 | Appalaraju ............ G06V 10/82 |
| 2013/0194617 A1* | 8/2013 | Link .................. H04N 1/32593 358/1.15 |

(Continued)

FOREIGN PATENT DOCUMENTS

| CN | 110149456 A | * | 8/2019 | ............ B41J 29/393 |
| CN | 118489253 A | * | 8/2024 | |

(Continued)

OTHER PUBLICATIONS

L. Baroffio, M. Cesana, A. Redondi and M. Tagliasacchi, "Performance evaluation of object recognition tasks in visual sensor networks," 2014 26th International Teletraffic Congress (ITC), Karlskrona, Sweden, 2014, pp. 1-9, doi: 10.1109/ITC.2014.6932943. (Year: 2014).*

(Continued)

*Primary Examiner* — Michael Robert Cammarata
(74) *Attorney, Agent, or Firm* — Leffler Intellectual Law, PLLC

(57) ABSTRACT

A system comprising a first image processing arrangement and a second image processing arrangement, wherein the first image processing arrangement comprises a controller configured to: a) receive an image; b) select a task and a task (Continued)

identifier associated with task data; c) compress the image based on the task data; and d) transmit the compressed image to the second image processing arrangement for processing, and wherein the second image processing arrangement comprises a controller configured to: e) receive the compressed image and task identifier; f) retrieve task parameters associated with the task identifier; g) process the compressed image based on the task parameters; h) determine results and i) transmit the at least indications of the determined results to the first image processing arrangement, and the controller of the first image processing arrangement is further configured to: j) receive at least indications of a result of the processing from the second image processing arrangement; and k) indicate the result.

24 Claims, 6 Drawing Sheets

(51) Int. Cl.
*G06T 9/00* (2006.01)
*G06V 10/96* (2022.01)

(52) U.S. Cl.
CPC .............. *G06T 2207/20012* (2013.01); *G06T 2207/20081* (2013.01); *G06T 2207/20084* (2013.01)

(56) References Cited

U.S. PATENT DOCUMENTS

| | | | |
|---|---|---|---|
| 2018/0063538 | A1 | 3/2018 | Bernal et al. |
| 2018/0174047 | A1 | 6/2018 | Bourdev et al. |
| 2018/0199039 | A1 | 7/2018 | Trepte |
| 2019/0158884 | A1 | 5/2019 | Tsai et al. |
| 2019/0327486 | A1* | 10/2019 | Liao ........................ H04N 19/52 |
| 2020/0143457 | A1* | 5/2020 | Manmatha .......... G06F 3/04812 |
| 2021/0110191 | A1* | 4/2021 | Gruteser ................ G06N 3/045 |
| 2022/0189155 | A1* | 6/2022 | Wu .......................... G06T 7/40 |
| 2024/0290055 | A1* | 8/2024 | El Essaili ............... G06F 3/011 |

FOREIGN PATENT DOCUMENTS

| | | | | |
|---|---|---|---|---|
| EP | 2595113 A2 * | 5/2013 | ........... | G06T 7/0004 |
| WO | 2018150083 A1 | 8/2018 | | |
| WO | 2020008104 A1 | 1/2020 | | |

OTHER PUBLICATIONS

Ahn J, Park J, Park D, Paek J, Ko J. Convolutional neural network-based classification system design with compressed wireless sensor network images. PLoS One. May 8, 2018;13(5):e0196251. doi: 10.1371/journal.pone.0196251. PMID: 29738564; PMCID: PMC5940226. (Year: 2018).*

Q. Wang, L. Shen and Y. Shi, "Recognition-Driven Compressed Image Generation Using Semantic-Prior Information," in IEEE Signal Processing Letters, vol. 27, pp. 1150-1154, 2020, doi: 10.1109/LSP.2020.3004967. (Year: 2020).*

European Communication issued Sep. 25, 2024 in connection with European Application No. 20711518.9, 16 pages.

PCT International Search Report, mailed Nov. 26, 2020, in connection with International Application No. PCT/EP2020/055525, all pages.

PCT Written Opinion, mailed Nov. 26, 2020, in connection with International Application No. PCT/EP2020/055525, all pages.

Galteri, L, et al., "Video Compression for Object Detection Algorithms", 2018 24th International Conference on Pattern Recognition (ICPR), Bejing, China, Aug. 20-24, 2018, pp. 3007-3012.

Balle, J. et al., "End-To-End Optimized Image Compression", published as a conference paper at ICLR 2017, arXiv:1611.01704v3 [cs.CV] Mar. 3, 2017, pp. 1-27.

Balle, J., et al., "Variational Image Compression with a Scale Hyperprior", Published as a conference paper at ICLR 2018, arXiv:1802.01436v2 [eess.IV] May 1, 2018, pp. 1-23.

Torfason, R., et al., "Towards Image Understanding from Deep Compression Without Decoding", published as a conference paper at ICLR 2018, arXiv:1803.06131v1 [cs.CV] Mar. 16, 2018, pp. 1-17.

Shen, Qui et al., "Coded Vision: Towards Joint Image Understanding and Compression via End-to-End Learning", Intelligent Virtual Agent. IVA 2015. LNCS; [Lecture Notes in Computer Science; Lect. Notes Computer], Sep. 19, 2018 Springer, Berlin, Heidelberg, vol. 11164 Chap. 1, No. 558, pp. 3-14.

* cited by examiner

SYSTEM, AN ARRANGEMENT, A COMPUTER SOFTWARE MODULE ARRANGEMENT, A CIRCUITRY ARRANGEMENT AND A METHOD FOR IMPROVED IMAGE PROCESSING UTILIZING TWO ENTITIES

TECHNICAL FIELD

The present invention relates to a system, an arrangement, an arrangement comprising computer software modules, an arrangement comprising circuits and a method for providing an improved manner of improved object detection, and in particular to a system, an arrangement, an arrangement comprising computer software modules, an arrangement comprising circuits and a method for providing an improved manner of improved object detection utilizing two entities such as two devices.

BACKGROUND

As computer and processing power grows, so does the application of computer vision and the complexity of the tasks where computer vision is utilized. To enable such complex tasks, artificial intelligence is being used more and more and machine learning are applied extensively to such complex machine vision tasks including segmentation, image classification and object detection.

Image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

Object detection is a computer technology related to computer vision and image processing that deals with detecting instances of semantic objects of certain classes (such as humans, buildings, or cars) in digital images and videos. Well-researched domains of object detection include human detection and automotive related object detection (pedestrian, cars, lanes, signs, etc.). Object detection has applications in many areas of computer vision, including image retrieval, industrial use, robotic vision and video surveillance.

Image classification refers to a process in computer vision that can classify an image according to its visual content. For example, an image classification algorithm may be designed to tell if an image contains a human figure or not. While detecting an object is trivial for humans, robust image classification is still a challenge in computer vision applications.

Performing such tasks (segmentation, image classification and/or object detection) utilizing artificial intelligence or machine learning is commonly achieved by utilizing neural networks, such as deep learning methods. However, such techniques are computationally highly demanding and it is therefore beneficial to offload a device designed to be lightweight and/or cheap (such as a head set viewing device, for example VR goggles) by transmitting the image to be processed on another or second device where the processing is performed. The received image is then processed by the second device that feeds the image to machine learning blocks or modules which perform inference, utilizing for example Convoluted Neural Networks providing feature maps, based on regions of interest, which feature maps may subsequently be used for object detection, image classification and/or segmentation.

The second device is usually more powerful than the first device which may offset the cost in latency and bandwidth incurred by transmitting the image. To further reduce the time-cost, the image may be compressed before being transmitted.

An image is captured in a camera or received in another manner from another image source. The image is firstly received in a raw format basically corresponding to the sensor data received from the camera sensor overlaid with a color filter, for example a Bayer filter providing a raw file in a Bayer format. For the context of this text a raw image will be considered to be an image sensor file possibly overlaid with a color filter, but no other filtering applied to it. Examples of such raw formats are raw image sensor format and CIS (Camera Image Sensor) format to mention a few. For the purpose of this text, raw image sensor format and CIS format will be referred to as raw format.

A raw image file is not suitable (at least not optimal) for human viewing and the raw image has to undergo substantial processing or filtering through Image Signal Processing procedural blocks (ISP) before the image looks as it is intended and may be consumed in the intended manner by a human. The purpose of applying the ISPs is to provide an image that can be viewed by a human and the resulting image file is usually provided in a JPEG, TIFF or other known image format. However, the same aspects that are important for human visions, may not—as the inventors have realized—be important, required or even beneficial for computer vision. As each filtering step removes or changes the original data, some data may even be lost through the filtering, and the resulting image may thus be less beneficial for use in computer vision. The image may thus be compressed in its raw format, which further reduces the computational effort required by the first device, and the second device will process the (compressed) raw format of the image.

To reduce the cost in latency and bandwidth and to reduce the computational effort on the second device, the processing (such as inference for subsequent segmentation, image classification and/or object detection) may be performed on the compressed image data directly, thereby removing the need to first decompressing the image. By combining the compression and the processing an efficient training of such neural networks is achieved, i.e. through an end-to-end training of the combined compression and processing (such as inference for subsequent segmentation, image classification and/or object detection).

However, the inventors have realized that such end-to-end training may not be optimum for all combinations of devices, and some tasks may suffer (less accuracy, higher computational effort or higher time-cost) when being performed on some devices or combinations of devices. The inventors have thus realized that there is a need for a system, an arrangement and a method for providing a manner of reduced processing of images, while still allowing for a high accuracy of object detection, segmentation and/or image classification when offloading the processing from a first arrangement to a second arrangement.

SUMMARY

An object of the present teachings is therefore to overcome or at least reduce or mitigate the problems discussed, by providing a manner of performing processing (such as inference for subsequent segmentation, image classification and/or object detection) specifying explicitly what task is to be performed, or rather how the task is to be performed, i.e. what model and what parameters should be used. The inventors are proposing an ingenious, simple and elegant manner of adapting the processing of an image, or parts of the file (i.e. regions) according to a specified task, which may also take into account what devices or arrangements are being used and thus providing optimum or desired models and weights for the neural network(s) to be used for the task.

According to one aspect an image processing arrangement system is provided. The system comprises a first image processing arrangement and a second image processing arrangement, wherein the first image processing arrangement comprises a controller configured to: a) receive an image; b) select a task and a task identifier associated with task data; c) compress the image based on the task data; and d) transmit the compressed image to the second image processing arrangement for processing, and wherein the second image processing arrangement comprises a controller configured to: e) receive the compressed image and task identifier; f) retrieve task parameters associated with the task identifier; g) process the compressed image based on the task parameters; h) determine results and i) transmit the at least indications of the determined results to the first image processing arrangement, and the controller of the first image processing arrangement is further configured to: j) receive at least indications of a result of the processing from the second image processing arrangement; and k) indicate the result.

The solution may be implemented as a software solution, a hardware solution or a mix of software and hardware components.

In one embodiment the image data file is in raw format.

In one embodiment the controller of the first image processing arrangement is further configured to b) select the task in communication with the controller of the second image processing arrangement and wherein the controller of the second image processing arrangement is further configured to select the task in communication with the controller of the first image processing arrangement.

In one embodiment the controller of the first image processing arrangement is further configured to c) compress the image utilizing a compressing neural network.

In one embodiment the controller of the second image processing arrangement is further configured to g) process the compressed image utilizing a processing neural network.

In one embodiment the processing neural network comprises a decompression neural network and a task performing neural network.

In one embodiment the controller of the first image processing arrangement and the controller of the second image processing arrangement are further configured to train the compressing neural network and the processing neural network respectively end-to-end.

In an alternative or additional such embodiment the controller of the first image processing arrangement and the controller of the second image processing arrangement are further configured to train the compressing neural network and the processing neural network respectively end-to-end by minimizing the bit rate (R) and the task accuracy loss (L).

In an alternative or additional such embodiment the controller of the first image processing arrangement and the controller of the second image processing arrangement are further configured to train the compressing neural network and the processing neural network respectively end-to-end by minimizing the distortion of the image (D), the bit rate (R) and the task accuracy loss (L).

In one embodiment the processing is object detection.

In one embodiment the first image processing arrangement is an optical see-through device.

In one embodiment the second image processing arrangement is a smartphone or a (tablet) computer.

In one embodiment the image processing arrangement is arranged to be used in image retrieval, industrial use, robotic vision and/or video surveillance.

In one embodiment the image processing arrangement is arranged to be used in image retrieval, industrial use, robotic vision, virtual reality as well as augmented reality and/or video surveillance.

A task may be aimed at an overall task requiring use of different neural networks. It should be noted that a task may not only be aimed at a specific overall task, such as object detection, segmentation or classification, but may also be aimed at more specific tasks such as object detection of specific objects (pets as opposed to vehicles). Such a specific task may be performed using the same neural network, but trained on different objects, i.e. having different values for network parameters (such as weights and models). A more specific task may also be to perform a same task but fulfilling different constraints, such as higher bit rate, higher accuracy, and/or reduced bandwidth. The same task may thus be achieved using different values for network parameters, such as weights and models.

According to one aspect a method for image processing in a system comprising a first image processing arrangement and a second image processing arrangement, wherein the method comprises in the first image processing arrangement: a) receiving an image; b) selecting a task and a task identifier associated with task data; c) compressing the image based on the task data; and d) transmitting the compressed image to the second image processing arrangement for processing, and wherein the method comprises in the second image processing arrangement: e) receiving the compressed image and task identifier; f) retrieving task parameters associated with the task identifier; g) processing the compressed image based on the task parameters; h) determining results and i) transmitting the at least indications of the determined results to the first image processing arrangement, and the method further comprises in the first image processing arrangement: j) receiving at least indications of a result of the processing from the second image processing arrangement; and k) indicating the result.

According to one aspect there is provided a computer-readable medium carrying computer instructions that when loaded into and executed by a controller of an image processing arrangement enables the image processing arrangement to implement a method according to herein.

According to one aspect there is provided a software component arrangement for image processing in an image processing arrangement system comprising a first image processing arrangement and a second image processing arrangement, wherein the software component arrangement comprises: a) a software component module for receiving an image in the first image processing arrangement; b) a software component module for selecting a task and a task identifier associated with task data in the first image processing arrangement; c) a software component module for compressing the image based on the task data in the first image processing arrangement; and d) a software component module for transmitting the compressed image to the second image processing arrangement for processing; e) a software component module for receiving the compressed image and task identifier in the second image processing arrangement; f) a software component module for retrieving task parameters associated with the task identifier in the second image processing arrangement; g) a software component module for processing the compressed image based on the task parameters in the second image processing arrangement; h) a software component module for determining results and i) a software component module for transmitting the at least indications of the determined results to the first image processing arrangement; j) a software component module for receiving at least indications of a result of the processing from the second image processing arrangement in the first image processing arrangement; and k) a software component module for indicating the result.

According to one aspect there is provided an image processing arrangement for image processing in an image processing arrangement system comprising a first image processing arrangement and a second image processing arrangement, the image processing arrangement comprising circuitry for processing images comprising: performing processing in an image processing arrangement, wherein the arrangement comprising circuitry comprises: a) a circuitry for receiving an image in the first image processing arrangement; b) a circuitry for selecting a task and a task identifier associated with task data in the first image processing arrangement; c) a circuitry for compressing the image based on the task data in the first image processing arrangement; and d) a circuitry for transmitting the compressed image to the second image processing arrangement for processing; e) a circuitry for receiving the compressed image and task identifier in the second image processing arrangement; f) a circuitry for retrieving task parameters associated with the task identifier in the second image processing arrangement; g) a circuitry for processing the compressed image based on the task parameters in the second image processing arrangement; h) a circuitry for determining results and i) a circuitry for transmitting the at least indications of the determined results to the first image processing arrangement; j) a circuitry for receiving at least indications of a result of the processing from the second image processing arrangement in the first image processing arrangement; and k) a circuitry for indicating the result.

According to one aspect there is provided a first image processing arrangement arranged as the first image processing arrangement comprised in the image processing arrangement system above and the appended claims.

According to one aspect there is provided a method for use in a first image processing arrangement comprising the steps performed by the first image processing arrangement comprised in the image processing arrangement system above as detailed by the method above and the appended claims.

According to one aspect there is provided a software module arrangement for use in a first image processing arrangement comprising the software modules corresponding to the software code modules performing functions for the first image processing arrangement as detailed by the software module arrangement above and the appended claims.

According to one aspect there is provided an image processing arrangement comprising circuitry for use in a first image processing arrangement comprising circuitry corresponding to the circuitry for performing functions for the first image processing arrangement as detailed by the image processing arrangement comprising circuitry above and the appended claims.

According to one aspect there is provided a second image processing arrangement arranged as the second image processing arrangement comprised in the image processing arrangement system above and the appended claims.

According to one aspect there is provided a method for use in a method image processing arrangement comprising the steps performed by the method image processing arrangement comprised in the image processing arrangement system above as detailed by the method above and the appended claims.

According to one aspect there is provided a software module arrangement for use in a method image processing arrangement comprising the software modules corresponding to the software code modules performing functions for the method image processing arrangement as detailed by the software module arrangement above and the appended claims.

According to one aspect there is provided an image processing arrangement comprising circuitry for use in a method image processing arrangement comprising circuitry corresponding to the circuitry for performing functions for the method image processing arrangement as detailed by the image processing arrangement comprising circuitry above and the appended claims.

It should be noted that even though the teachings are disclosed as used for object detection, they may equally be applied to segmentation and/or image classification and there will not be made any difference between object detection and segmentation and/or image classification herein. Further embodiments and advantages of the present invention will be given in the detailed description. It should be noted that the teachings herein find use in segmentation, object detection, image classification and image processing arrangements in many areas of computer vision, including image retrieval, industrial use, robotic vision, virtual reality as well as augmented reality and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION

Figure 1A:
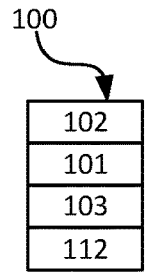
FIG. 1A shows a schematic view of an image processing arrangement according to an embodiment of the present invention.

FIG. 1A shows a schematic view of an image processing arrangement 100 according to an embodiment of the present invention. The image processing arrangement comprises a controller 101, a memory 102, an image data receiving device 112, such as for example a camera or image sensor, an image streaming device (such as a communication interface) or an image data reading device arranged to read image data from the memory 102. The controller 101 is configured to receive at least one image data file, corresponding to at least an image, from the image data receiving device 112, and to perform filtering such as by applying a number of ISPs to the image data file and subsequently to perform object detection (and/or image classification or segmentation) on the resulting (portion of the) image. The image data receiving device 112 may be comprised in the image processing arrangement 100 by being housed in a same housing as the image processing arrangement, or by being connected to it, by a wired connection or wirelessly.

It should be noted that the image processing arrangement 100 may comprise a single device or may be distributed across several devices and apparatuses.

The controller 101 is also configured to control the overall operation of the image processing arrangement 100. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits, AISIC, GPU, etc. in addition or as an alternative. For the purpose of this application, all such possibilities and alternatives will be referred to simply as the controller 101.

The memory 102 is configured to store graphics data and computer-readable instructions that when loaded into the controller 101 indicates how the image processing arrangement 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the image processing arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

It should be noted that the teachings herein find use in arrangements for object detection, segmentation and/or image classification and image filtering in many areas of computer vision, including object detection in mixed or augmented reality systems, image retrieval, industrial use, robotic vision and video surveillance where a basic image processing arrangement 100 such as in FIG. 1A may be utilized. In one embodiment, the image processing arrangement 100 is a digital camera or other image sensor device (or comprised in such device). In one embodiment, the image processing arrangement 100 is connected to a digital camera or other image sensor device.

Figure 1B:
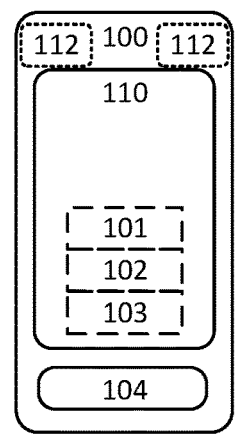
FIG. 1B shows a schematic view of an image processing arrangement according to an embodiment of the present invention.

FIG. 1B shows a schematic view of an image processing arrangement being a viewing device 100 according to an embodiment of the present invention. In this embodiment, the viewing device 100 is a smartphone or a tablet computer. In such an embodiment, the viewing device further comprises a display arrangement 110, which may be a touch display, and the image data receiving device 112 may be a series of cameras of the smartphone or tablet computer. In such an embodiment the controller 101 is configured to receive an image from the camera (or other image receiving device) 112, detect objects in the image and display the image on the display arrangement 110 along with virtual content indicating or being associated with the detected object(s). In the example embodiment of FIG. 1B, the camera 112 is arranged on a backside (opposite side of the display 110, as is indicated by the dotted contour of the camera 112) of the image processing arrangement 100 for enabling real life objects behind the image processing arrangement 100 to be captured and shown to a user (not shown in FIG. 1B) on the display 110 along with any displayed virtual content. The displayed virtual content may be information and/or graphics indicating and/or giving information on detected objects.

Figure 1C:
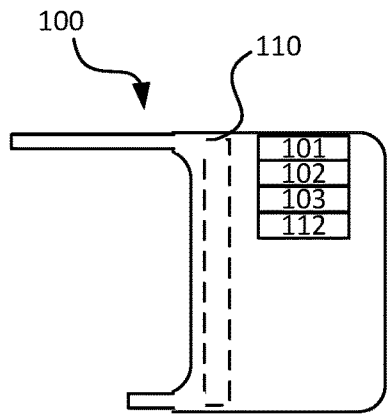
FIG. 1C shows a schematic view of an image processing arrangement according to an embodiment of the present invention.

FIG. 1C shows a schematic view of an image processing arrangement being or being part of an optical see-through (OST) viewing device 100 according to an embodiment of the present invention. The viewing device 100 is a see-through device, where a user looks in through one end, and sees the real-life objects in the line of sight at the other end of the viewing device 100. The viewing device 100 is in one embodiment a virtual reality device.

In one embodiment the viewing device 100 is a head-mounted viewing device 100 to be worn by a user (not shown explicitly in FIG. 1C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device comprises a display arrangement 110 for presenting virtual content to a viewer and an image data receiving device 112 for identifying or detecting objects. As disclosed above with reference to FIG. 1A, the image data receiving device 112 may be remote and comprised in the image processing arrangement through a connection to the image processing arrangement 100.

It should also be noted that even if only one image data receiving device 112 is discussed in the above, the image data receiving device is arranged to receive image data relating to more than one image, such as a video sequence or from parallel image sources, for advanced photo manipulation effects.

Figure 1D:
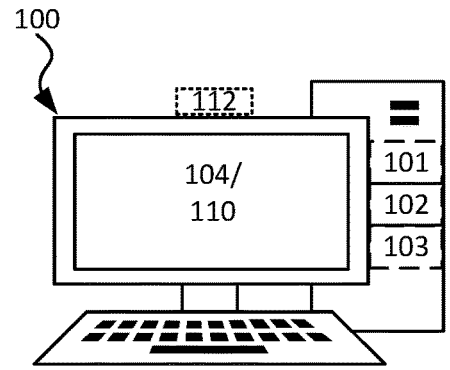
FIG. 1D shows a schematic view of an image processing arrangement according to an embodiment of the present invention.

FIG. 1D shows a schematic view of an image processing arrangement 100 according to an embodiment of the present invention. In this embodiment, the image processing arrangement 100 is a computer. In one such embodiment, the image processing arrangement is arranged to operate as a second image processing arrangement arranged to receive an image from another (first) image processing arrangement as will be discussed in the below with reference to FIG. 2. A first image processing arrangement 100 is generally seen as an image receiver and the second image processing arrangement 100 is generally seen as an image processor. It should be noted that even though the description of the image processing arrangement 100 of FIG. 1D is aimed at a computer, all embodiments of image processing arrangements given with reference to FIGS. 1A, 1B may also be arranged to operate as a second image processing arrangement. Specific examples of embodiments operating as a second image processing arrangement 100D are computers, laptop computers, tablet computers and/or smartphones. In one embodiment, the computer 100 is comprised in a cloud service and may thus be a collection of computers or other computational resources, commonly referred to herein as a cloud computer.

In the following, simultaneous reference will be made to the image processing arrangements 100 of FIGS. 1A, 1B, 1C and 1D.

In one embodiment the image processing arrangement 100 further comprises a communication interface 103. The communication interface may be wired and/or wireless. The communication interface 103 may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobile) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the image processing arrangement 100 and an external host device (not shown).

The communications interface 103 is configured to enable the image processing arrangement 100 to communicate with other devices, such as other image processing arrangements 100 and/or smartphones, Internet tablets, computer tablets or other computers, media devices, such as television sets, gaming consoles, video viewer or projectors (not shown), or image capturing devices for receiving the image data streams. In particular, the communications interface 103 is configured to enable the image processing arrangement 100 to communicate with a second image processing arrangement.

A user interface 104 may be comprised in or be connected to the image processing arrangement 100 (only shown in FIG. 1B and FIG. 1D). Additionally or alternatively, (at least a part of) the user interface 104 may be comprised remotely in the image processing arrangement 100 through the communication interface 103, the user interface then (at least a part of it) not being a physical means in the image processing arrangement 100, but implemented by receiving user input through a remote device (not shown) through the communication interface 103. One example of such a remote device is a game controller, a mobile phone handset, a tablet computer or a computer.

Figure 2:
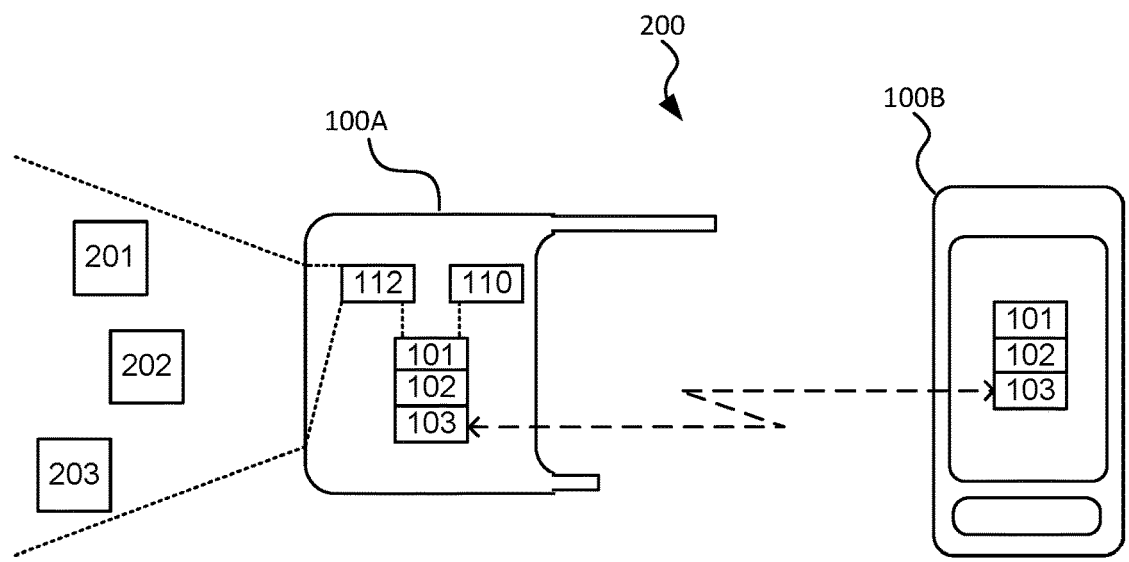
FIG. 2 shows a schematic view of an object detection system including at least two image processing arrangements according to one embodiment of the teachings herein.

FIG. 2 shows a schematic view of an object detection system 200 according to an embodiment herein. The object detection system 200 comprises a first image processing arrangement 100A and at least one second image processing arrangement 100B. As noted above, the first image processing arrangement 100A is arranged to operate as an image receiver and the second image processing arrangement 100B is arranged to operate as an image processor. By enabling a first image processing arrangement 100A to transmit an image to a second image processing arrangement 100B for processing, in particular for performing tasks such as object detection, segmentation and/or image classification, the first image processing arrangement 100A may be relieved of heavy computations which enables for producing smaller and/or cheaper image processing arrangements.

In the example of FIG. 2, the first image processing arrangement 100A is receiving an image that contains a number of objects. In the example of FIG. 2, the image is received through the image receiving device 112, for example a camera that captures an image of three objects 201-203. It should be noted that this is only an example and an image may contain any (including zero) number of objects and there are many different ways for an image to be received. As stated and as would be understood, an image may be received by being captured by a camera, by being fetched or retrieved from a memory 102 (local or remote) or being received through the communication interface 103, such as when streaming.

In a specific example, the first image processing arrangement 100A is a viewing device (such as disclosed with reference to FIG. 1C) arranged for virtual, augmented or other manipulated realities, and the second image processing arrangement 100B is a smartphone (such as disclosed with reference to FIG. 1B) or a computer (such as disclosed with reference to FIG. 1D).

Figure 3:
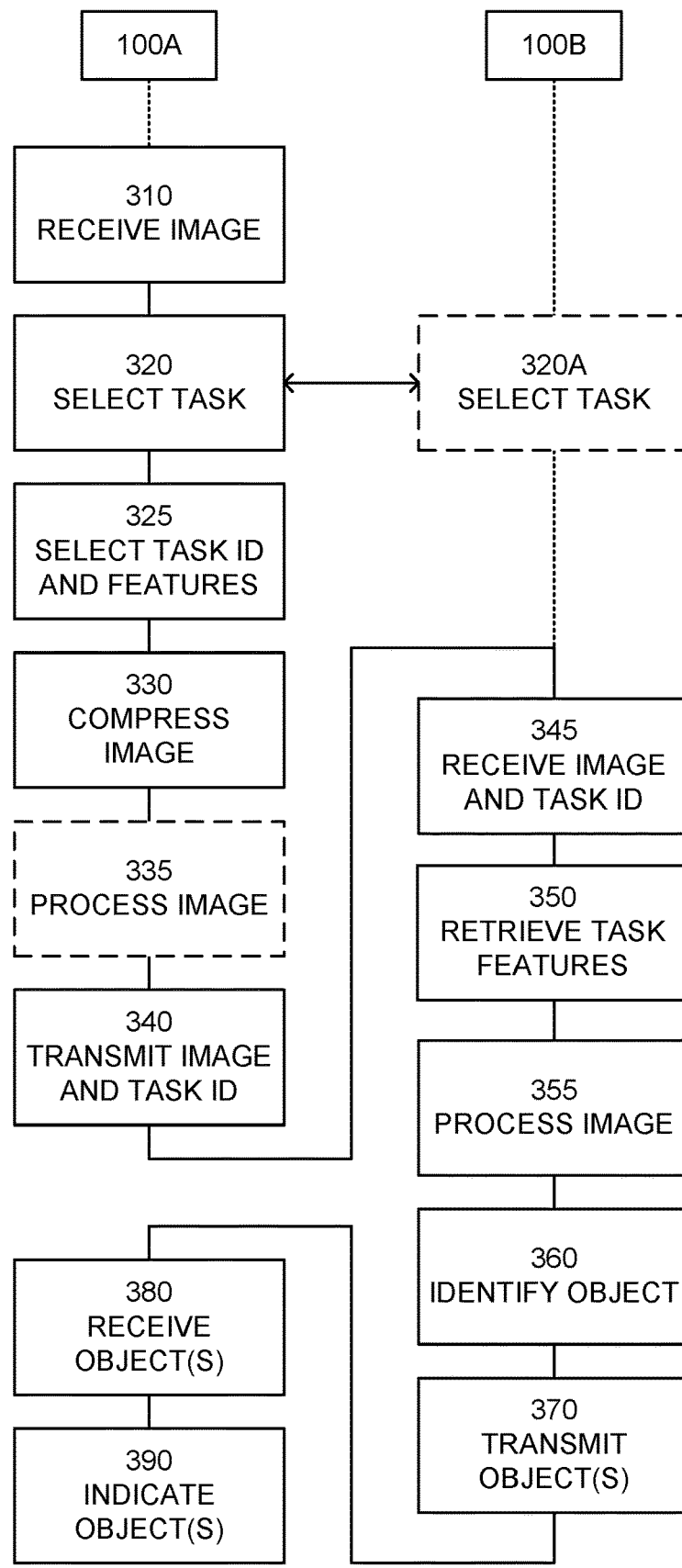
FIG. 3 shows a flowchart of a general method according to an embodiment of the present invention.

The general principle of the teachings herein will now be disclosed using specific example with simultaneous reference to the system of FIG. 2 and the method of FIG. 3.

FIG. 3 shows a flowchart of a general method according to an embodiment of the teachings herein. The method utilizes an image processing arrangement 100 as taught herein. The method comprises a (first) image processing arrangement 100(A) receiving 310 an image, as is also disclosed above with reference to FIG. 2, the first image processing arrangement 100A receiving an image containing the three objects 201-203. As is also stated above, the image may be received from an external source or from the memory 102, or from a camera 112 of the image processing arrangement 100. For the purpose of the teachings herein there will be made no difference between the mage and the data file representing the image and the two will be used interchangeably and it should be noted that a skilled person would understand when reference is made to the actual image and when reference is made to the data file (or a conversion of it) representing the image.

As a next step, the image would be compressed and transmitted to the second image processing arrangement 100B for (further) processing. A joint (end-to-end) training of compression and processing, such as autoencoder and inference of networks, to achieve a better combination of inference accuracy and compression ratio is beneficial. However, as realized by the inventors, and hinted at above, this means that the first and second image processing arrangements 100A and 100B are jointly trained for specific tasks, and the resulting weights and resulting compressed bit stream are then specific for such a trained image processing arrangement pair 100A-100B. The image processing arrangement pair will thus operate efficiently for the scenario it was trained for, however, for other scenarios, where potentially other objects should be detected, other tasks are to be performed or where the models or training have been further optimized, the resulting weights and bit-stream (compressed image) would be different. A first image processing arrangement 100A trained for a certain model or task-set, producing a data-stream DA, might not be correctly decoded or processed with a second image processing arrangement 100B trained for another model or task-set. In today's society where adaptability and compatibility are of utmost important for devices to be successful, this is a real problem that the inventors have realized. As VR goggles have been researched since the early nineties and as the first commercially successful VR goggle (Oculus VR) paired with a smartphone was initiated already in 2012 the problem of how to achieve sufficiently efficient VR goggles is a long-standing problem and the inventors have realized a significant manner of solving this overall long-standing problem.

Furthermore, there are several reasons that the inventors have insightfully identified through inventive reasoning why different weights, and even different neural network models, should be available for performing different tasks. Examples of such reasons are: further optimizations of a system (such as the system 200 in FIG. 2) provides revisions with better accuracy/compression, or other (or additional) objects are to be detected or identified. It should be pointed out that in object detection (as well as classification and segmentation) if a system is not trained to recognize for example dogs, it will not be able to detect dogs and the system thus has to be trained explicitly to do so. Furthermore, in a system, several trained models/weights might co-exist: one image retrieving device 112, such as a camera sensor, might switch between weight-sets depending on scenario (e.g. suitable to detect different types of objects), or there might be several different sensors producing data and these have differing models/weights. Another aspect is if the system toggles between scenarios where the bit-stream should be visible at the decoder side (i.e. at the second image processing arrangement 100B) vs. when only a machine shall consume the data—then it would be natural to switch between encoding/decoding tasks. Furthermore, if the compressed bit-stream is stored in a file, it is imperative that it is understood with which decoder such data should be later decoded and analyzed. Contemporary techniques do not describe these problems, nor do they provide solutions. However, the inventors have both realized these situations, the associated problem(s) and are proposing a solution to overcome or at least mitigate these shortcomings.

As discussed briefly above, image compression with end-to-end training of neural network has achieved a significant progress during recent years. A notable technique is to approximate the quantization process with an addition of uniform noise in the latent variable space. This enables a back-propagation through the quantization process. Another technique that can be used to render the end-to-end possible, is to estimate the entropy of the latent variables to approximate their bit-rate for compression as the entropy is the lower bound of the achievable rate in average. An approach with a variational autoencoder has outperformed the-state-of the-art in terms of image coding. By introducing additional latent variables conditioned on the variables for the compressed representation, the spatial dependencies left are modeled.

Compression can be conducted through an end-to-end training manner. The inference network for a given task can then be cascaded to the autoencoder for an end-to-end training to obtain an accurate inference while minimizing the compression bit-rate. Because such encoder-decoder pairs are jointly trained and optimized for certain tasks, the data flow becomes also dependent on this encoder-decoder pair (or image processing arrangement pair).

The proposed solution addresses the problem of multiple networks/weights, i.e., to switch the weights of the neural network for a specific task by using a task identification (ID) number.

The first image processing arrangement 100A is thus configured to, prior to compressing 330 the image, select 320 which task is to be performed, or rather how the task is to be performed by selecting the model and the parameters to be used, and to select 325 a task identification (ID) (for example a number) that identifies or indicates the selected task.

This task ID is communicated between the two image processing arrangements prior to the second image processing arrangement 100B executing the task. The task ID may be communicated by being transmitted along with the compressed image, or by being (possibly) implicitly indicated through the task selection process. As will be discussed below, the task selection 320 may be performed through a hand-shake protocol between the first image processing arrangement 100A and the second image processing arrangement 100B.

Based on the task ID, the corresponding weights or other parameters are loaded on both image processing arrangements for consequent execution. The task parameters may be retrieved from a local memory, such as the memory 102, or from a remote storage, such as through a cloud service. For the purpose of the teachings herein, there will not be made any difference from where the task parameters are retrieved.

The task parameters may be seen to be retrieved as part of selecting 325 the task ID by the first image processing arrangement 100A.

As the task (and the corresponding task ID) has been selected and the task parameters have been retrieved, the first image processing arrangement 100A compresses 330 the image based on the task parameters. As is indicated in FIG. 3, an optional (pre-) processing 335 may also be performed by the first image processing arrangement 100A for increasing the accuracy of the task, by performing some processing that is beneficially performed while compressing the image. The compressed image is then transmitted 340 from the first image processing arrangement 100A to the second image processing arrangement 100B. The task ID is also transmitted 340, as discussed above, possibly along with the image.

As the second image processing arrangement 100B receives 350 the compressed image, the second image processing arrangement 100B will retrieve 350 the task parameters based on the received task ID (possibly received along with the image, or indicated through the task selection process). The task parameters may be retrieved as part of receiving (345) the task ID by the second image processing arrangement 100B, or when selecting (320A) the task. As the task parameters have been retrieved, the task is performed, i.e. the second image processing arrangement 100B processes 355 the image based on the task parameters. In the example of object detection, the second image processing arrangement 100B thereby detects 360 the object(s) 201-203 in the image and transmits 370 indications of the detected object(s) 201-203 to the first image processing arrangement 100A. For other tasks, the second image processing arrangement 100B analyzes 360 the results of the processing and transmits 370 indications of the results to the first image processing arrangement 100A. Optionally the second image processing arrangement 100B may also display or otherwise utilize the results of the processing at its end. For example, the image may be displayed along with the detected objects on a display 110 or through other user interface 104 of the second image processing arrangement 100B.

A second image processing arrangement 100B might support multiple sets of weights and be capable of receiving alternative streams from different first image processing arrangements 100A with different weight-sets, and the communication of task IDs guides the selection of as well as switching of weights or other task parameters.

As discussed above, the relation between task ID and task parameters (such as weights and/or model descriptions), i.e. task data, can be stored in a location available to all devices, such as in a cloud server. The task data can be stored as pure data or as encrypted data for security perspectives. Alternatively or additionally, the task data can be stored at each image processing arrangement. In one embodiment some task data is stored remotely and some task data is stored locally.

Returning to the first image processing arrangement 100A, it receives 380 the result(s) of the processing and utilizes 390 the results. In the example of object detection, the first image processing arrangement 100A receives 380 the object(s) or at least indication(s) of the object(s) and displays them, or otherwise indicates 390 the object(s), for example on the display device 110 or through other user interface 104.

As has been discussed in the above, the first image processing arrangement 100A selects which task is to be used. In order for an optimum (or at least beneficial) performance to be achieved and to enable for a higher adaptability for different image processing arrangement pairs, the first image processing arrangement 100A may be configured to select which task parameters, i.e. specific task, that is to be used for an overall task. As the overall task has been selected, the first image processing arrangement 100A may thus communicate this to the second image processing arrangement 100B whereby a handshake protocol is initiated between the first image processing arrangement 100A and the second image processing arrangement 100B for selecting 320/320A the task data that provides the better performance for both image processing arrangements. For example, if the first image processing arrangement 100A wants the bitrate to be constrained to a certain threshold, but the second image processing arrangement 100B also wants to minimize its cost (energy usage, etc., as reloading the weight may consume extra energy for the devices), one interesting outcome could be that the second image processing arrangement 100B prefers to keep the weights that are already loaded into local memory 102 (thereby for example saving energy and time by not loading the task data) if such a decision also meets the bitrate constraint of the source.

As a generalization of the handshake process for multiple task operations, task scheduling among the devices can be introduced, i.e., to determine which task to run first. For example, the first image processing arrangement 100A may stipulate its task with some constraints (delay, for example). Then, the second image processing arrangement 100B (potentially capable of hosting multiple models, weight-sets) should optimize for two metrics simultaneously: minimizing its energy usage (e.g. by keeping current weights in memory as long as possible) and minimizing the maximum delay experienced by client tasks.

As indicated above, the networks are trained for a specific task, such as a specific object detection task. When switching task, for example for performing object detection for a different set of objects, firstly, the task ID of the corresponding weights for the neural networks is communicated between image processing arrangements. Thereafter, the weights and/or other task parameters (i.e. the task data) are loaded into the neural networks from the local memory. The task data of the neural network are stored after training in the local memory and synced between both image processing arrangements. Additionally or alternatively, the task data can be stored in a network database, such as a cloud service. For example, the task data are only stored in an online database and are synced to one or both of the image processing arrangements when switching tasks. It should be noted that the first image processing arrangement 100A may store a different set of task data locally, than the second image processing arrangement 100B.

Returning to the specific example of FIG. 2, where a user wearing AR goggles (first image processing arrangement 100A, such as the viewing device disclosed with reference to FIG. 1C) is watching traffic (objects 201-203) flow by on a highway. As the controller 101 of the AR goggles 100A receives 310 an image of cars (objects) 201-203 through the camera 112, a task is selected 320 and a task ID is selected 325 along with retrieving task parameters from the local memory 102 (assuming locally stored task parameters) or possibly through the communication interface 103 of the AR goggles 100A (assuming remotely stored parameters). Thereafter the image is compressed 330 (and possibly (pre-)processed 335) by the controller 101 before being transmitted 340 to a smartphone of the user (the second image processing arrangement 100B, such as the smartphone disclosed with reference to FIG. 1B) through the communication interface 103 of the AR goggles 100A. The controller 101 of the smartphone 100B receives 345 the (compressed) image through the communication interface 103 of the smartphone 100B and retrieves 350 the task ID and associated task parameters from the memory 102 of the smartphone 100B (assuming locally stored parameters) or possibly through the communication interface 103 of the smartphone 100B (assuming remotely stored parameters). The controller 101 of the smartphone 100B then performs object detection 355 (i.e. processes) on the image and detects three cars (objects 201-203). The three cars 201-203 are identified as one being a police car and the two others being civilian or non-descript cars. An indication of the detected cars 201-203 and their classifications are transmitted 370 through the communication interfaces 103 of the smartphone 100B and the AR goggles 103 to the AR goggles 100A that receives 380 the indications of the cars 201-203 and indicates 390 the classifications of the cars 201-203 as one being a police car, by marking the car being a police car with a square and the text label "POLICE" overlaying the portion of the image representing the police car on the display device 110 of the AR goggles 100A.

In one embodiment, the task ID is encrypted to provide for an easy manner of providing security. By only encrypting the task ID, a minimum of computational resources are used to provide sufficient security as the compressed image data is unintelligible without knowing which task parameters associated with the task ID was used when compressing the image. Prior to the communication of the task ID, a public key and a private key for an encryption are generated and deployed in the respective image processing arrangements. An example is to deploy the public key at the first image processing arrangement and the private key at the second image processing arrangement. When the task selecting operation is to be performed, for example, the first image processing arrangement determines the appropriate model/weight, i.e. task data, to use, encrypt its task ID and sends the encrypted task ID to the second image processing arrangement 100B. Upon the second image processing arrangement 100B receiving the encrypted ID, the task ID is decrypted using the private key by the second image processing arrangement 100B. The corresponding task parameters are then chosen for performing the task. In the case when a handshake is performed. A feedback will be generated from the second image processing arrangement 100B to the first image processing arrangement 100A to confirm or reject the task selection request 320/320A.

Additionally or alternatively, the second image processing arrangement 100B can also suggest a task ID, which is encrypted and sent to the first image processing arrangement 100A based on the optimization outcome mentioned in the handshake process.

Figure 4:
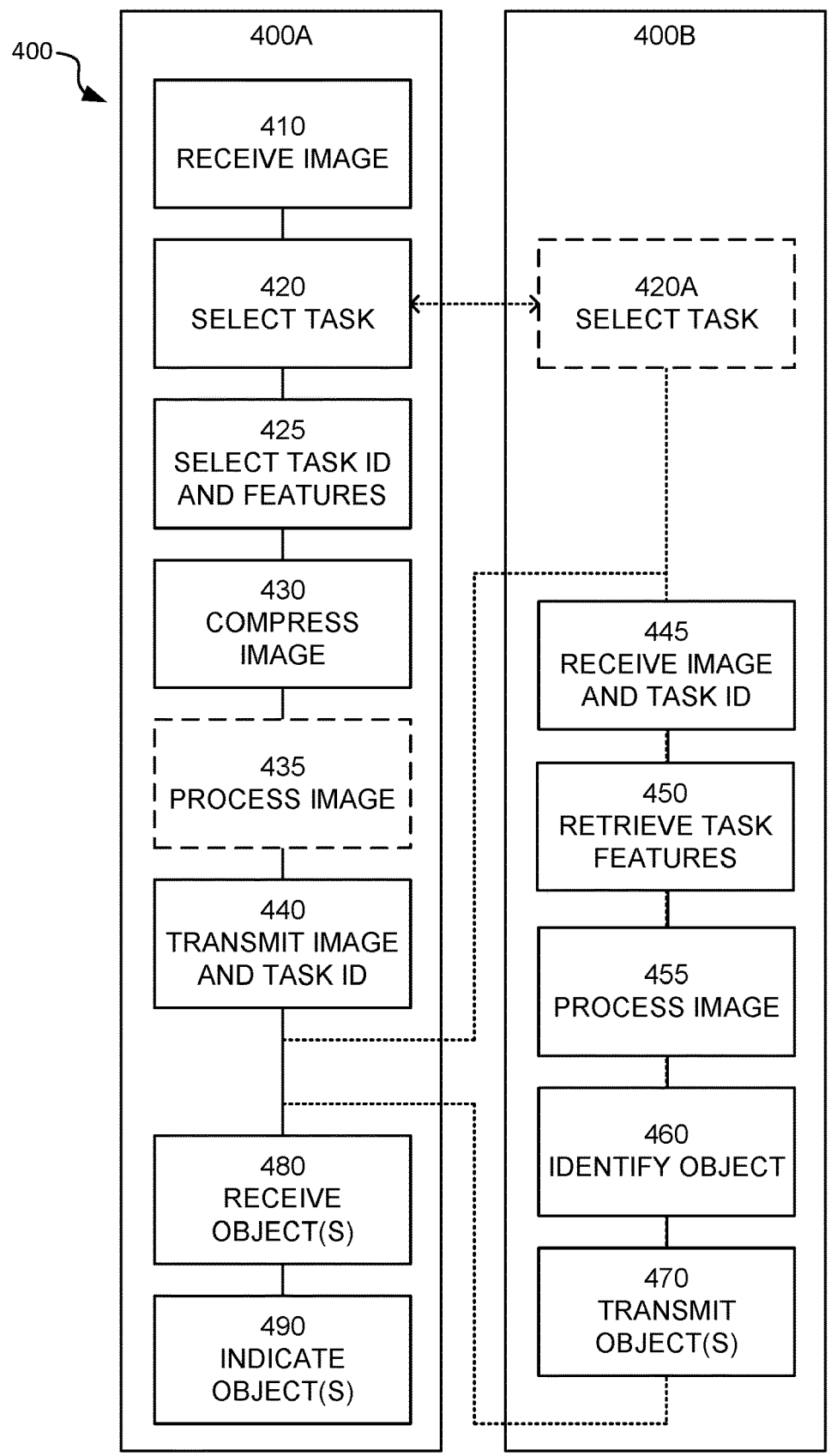
FIG. 4 shows a component view for a software component arrangement according to an embodiment of the teachings herein.

FIG. 4 shows a component view for a software component (or module) arrangement 400 according to an embodiment of the teachings herein. The software component arrangement 400 is adapted to be used in an image processing arrangement system 200 as taught herein for providing image processing possibly object detection, segmentation and/or image classification as taught herein. The image processing arrangement system 200 comprises a first image processing arrangement 100A and a second image processing arrangement 100. The software component arrangement 400 comprises a software component module for receiving 410 an image in the first image processing arrangement 100A and a software component module for selecting 420 a task and 425 a task identifier associated with task data in the first image processing arrangement 100A. The software component arrangement 400 also comprises a software component module for compressing 430 the image based on the task data in the first image processing arrangement 100A and a software component module for transmitting 440 the compressed image to the second image processing arrangement 100B for processing. The software component arrangement 400 also comprises a software component module for receiving 445 the compressed image and task identifier in the second image processing arrangement 100B and a software component module for retrieving 450 task parameters associated with the task identifier in the second image processing arrangement 100B. The software component arrangement 400 also comprises a software component module for processing 455 the compressed image based on the task parameters in the second image processing arrangement 100B, a software component module for determining 460 results and a software component module for transmitting 470 the at least indications of the determined results to the first image processing arrangement 100A. The software component arrangement 400 also comprises a software component module for receiving 480 at least indications of a result of the processing from the second image processing arrangement 100B in the first image processing arrangement 100A and a software component module for indicating 490 the result.

Figure 5:
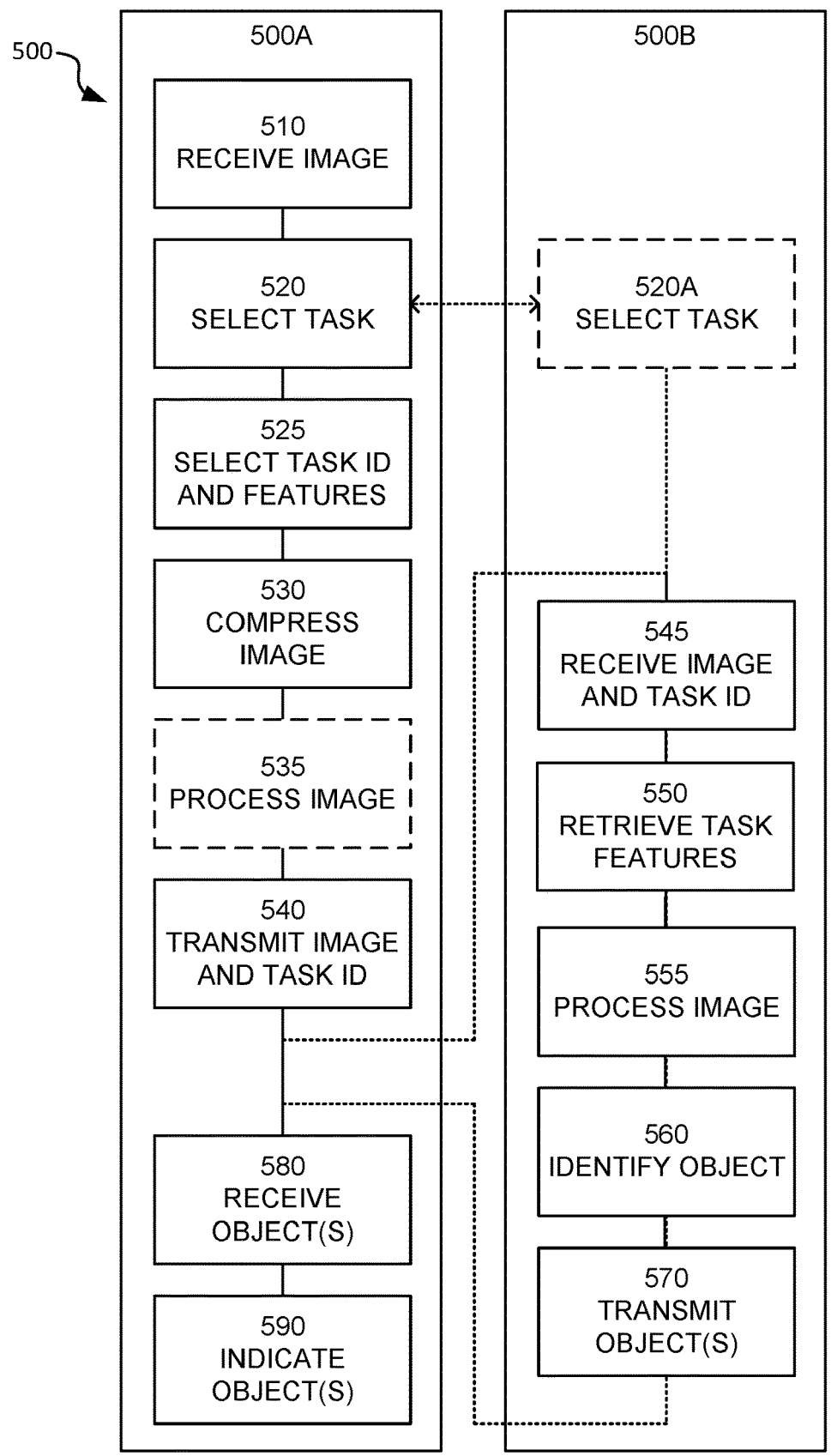
FIG. 5 shows a component view for an arrangement comprising circuits according to an embodiment of the teachings herein.

FIG. 5 shows a component view for an image processing arrangement 500 according to an embodiment of the teachings herein. The image processing arrangement 500 is adapted to be used in an image processing arrangement system 200 as taught herein for providing image processing possibly object detection, segmentation and/or image classification as taught herein. The image processing arrangement system 200 comprises a first image processing arrangement 100A and a second image processing arrangement 100. The image processing arrangement 500 comprises a circuitry for receiving 510 an image in the first image processing arrangement 100A and a circuitry for selecting 520 a task and 525 a task identifier associated with task data in the first image processing arrangement 100A. The image processing arrangement 500 also comprises a circuitry for compressing 530 the image based on the task data in the first image processing arrangement 100A and a circuitry for transmitting 540 the compressed image to the second image processing arrangement 100B for processing. The image processing arrangement 500 also comprises a circuitry for receiving 545 the compressed image and task identifier in the second image processing arrangement 100B and a circuitry for retrieving 550 task parameters associated with the task identifier in the second image processing arrangement 100B. The image processing arrangement 500 also comprises a circuitry for processing 555 the compressed image based on the task parameters in the second image processing arrangement 100B, a circuitry for determining 560 results and a circuitry for transmitting 570 the at least indications of the determined results to the first image processing arrangement 100A. The image processing arrangement 500 also comprises a circuitry for receiving 580 at least indications of a result of the processing from the second image processing arrangement 100B in the first image processing arrangement 100A and a circuitry for indicating 590 the result.

Figure 6:
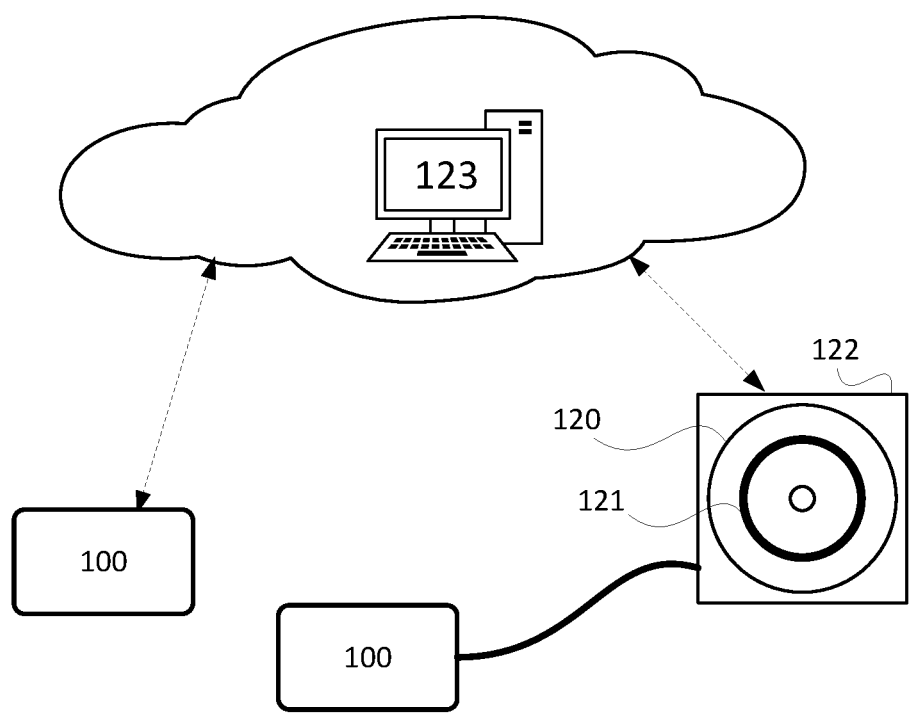
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of an image processing arrangement 100 enables the image processing arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the image processing arrangement 100 for being executed by the controller 101.

The computer disc reader 122 may also or alternatively be connected to (or possibly inserted into) an image processing arrangement 100 for transferring the computer-readable computer instructions 121 to a controller of the image processing arrangement (presumably via a memory of the image processing arrangement 100).

FIG. 6 shows both the situation when an image processing arrangement 100 receives the computer-readable computer instructions 121 via a wireless server connection (non-tangible) and the situation when another image processing arrangement 100 receives the computer-readable computer instructions 121 through a wired interface (tangible). This enables for computer-readable computer instructions 121 being downloaded into an image processing arrangement 100 thereby enabling the image processing arrangement 100 to operate according to and implement the invention as disclosed herein.

Figure 7:
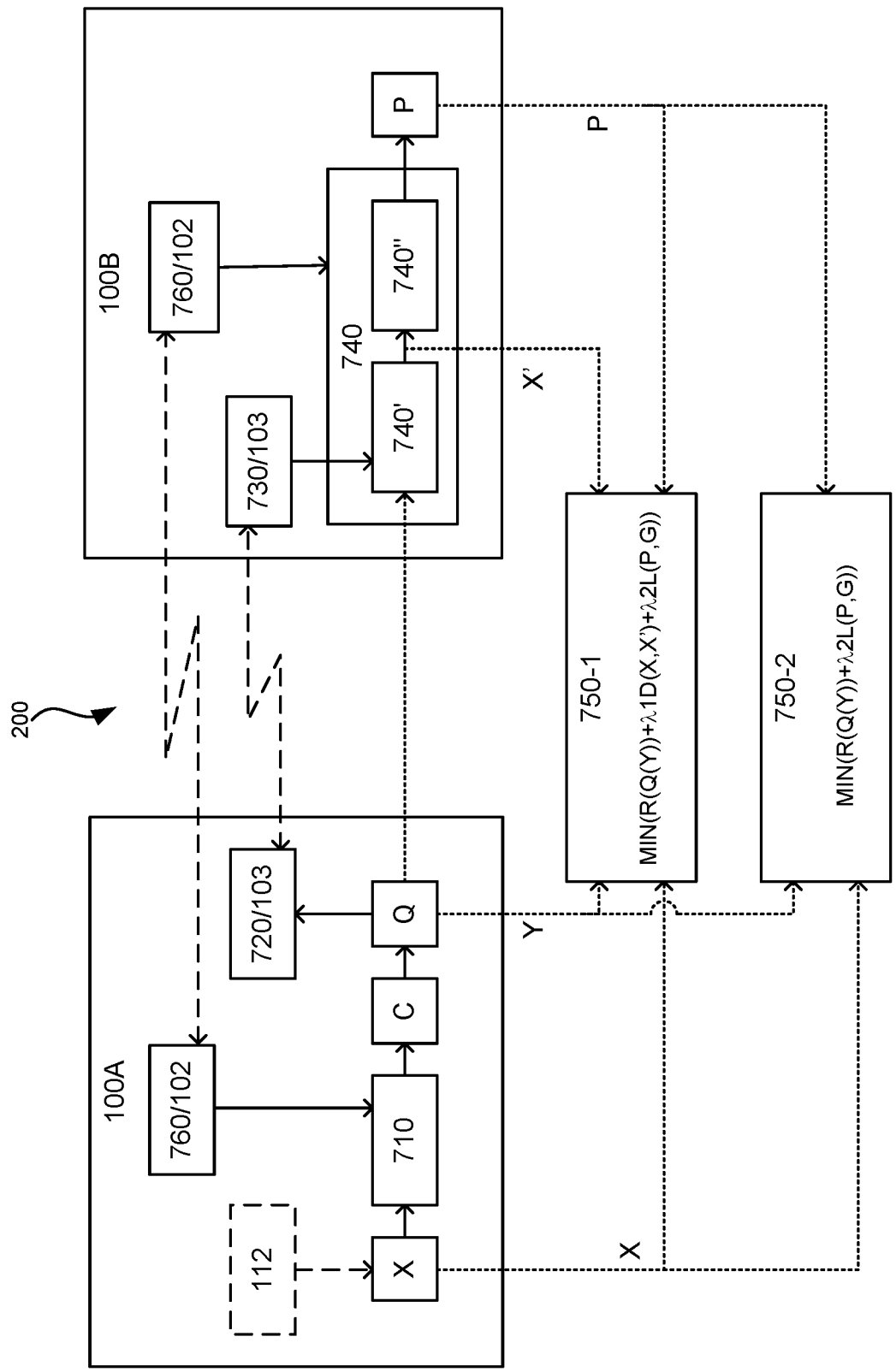
FIG. 7 shows a schematic view of a system, such as the system 200 of FIG. 2, according to one embodiment of the teachings herein.

A detailed description will now be given as to how the processing may be performed over the first and the second image processing arrangements. FIG. 7 shows a schematic view of a system, such as the system 200 of FIG. 2, according to one embodiment of the teachings herein.

The system comprises a first image processing arrangement 100A and a second image processing arrangement 100B, such as any of the image processing arrangements disclosed in reference to FIGS. 1A-1D above. The first image processing arrangement 100 and the second image processing arrangement 100B constitutes a compression and -interference framework, in an embodiment where the processing is inference for later object detection, segmentation or classification. The first image processing arrangement 100A comprises encoding (or compressing) neural networks 710 for performing the compression (and possibly (pre-) processing) including encoding, quantization (Q), and decoding. The encoding neural networks 710 are arranged to receive an image X possibly from the camera 112, whereby the encoding neural network will compress and encode the image into a compressed format C which then undergoes a quantization process Q. The first image processing arrangement 100A also comprises an encoder 720 possibly a part of or at least connected to a communication interface 103 for transmitting the quantized and encoded bit stream to the second image processing arrangement 100B. The second image processing arrangement 100B comprises a decoder 730 possibly a part of or at least connected to a communication interface 103 for receiving the encoded bit stream from the first image processing arrangement 100A. The second image processing arrangement 100B also comprises a processing neural network 740, which may comprise a decoding or decompressing network 740' and a task network 740", such as a network for inference and later object detection, segmentation or classification.

As discussed above, the networks 710 and 740 are trained end-to end to provide as high accuracy of the task to be performed as possible. The objective is to minimize the bit-rate (R) and the detection loss (L) function (i.e. task accuracy) at the same time. Without the loss of generality, a weight $\lambda 1$ is also added to take into account the distortion (D(X, X')) between the original signal (X) and the reconstructed signal (X'). Setting $\lambda 1$ to zero eliminates the effect of this constrain. The training block 750-1 indicates one alternative for training the neural networks end-to-end, where the bit rate (R) is expressed as a function of the quantization process Q(Y), the distortion D(X, X') is expressed as a function of the original signal X and the reconstructed signal X' and where the detection (or other task) accuracy loss function L is expressed as a function L(P,G) of the prediction (or task) results P and a factor G, the ground truth [be the "actual" information provided by direct measurement or observation. Instead of the result provided by the inference (prediction). For this kind of task, the ground truth would be the label (e.g., class and bounding box) provided for training the object detector (the image processing arrangement). As indicated, various elements may be weighted by weights □. In the example shown, the distortion D and the accuracy loss L are weighted by weights □1 and □2 respectively.

Alternatively, a variation as discussed above, in which the decoding network and the object detection (or task) network are merged together into a composite task network 740. This can possibly reduce the number of layers and parameters for the decoding and object detection network when the perceptual quality is not considered at all, as is the case if the second image processing arrangement 100B is not to display the resulting image and only to provide task results to the first image processing arrangement 100A. In such an alternative, the training block 750-2 indicates one alternative for training the neural networks end-to-end, where the bit rate (R) is expressed as a function of the quantization process Q(Y) and where the detection accuracy loss function L is expressed as a function L(P,G) of the prediction (or task) results P and a factor G, the ground truth. As indicated, various elements may be weighted by weights □. In the example shown, the accuracy loss L are weighted by weight □2.

The deployment of the system 200 after training is shown in FIG. 7, where the encoder network 710 resides in the first image processing arrangement 100A, i.e. the capture device (for example a light-weight head-set as in the example of FIG. 7), and the decoder plus the object detector network 740 work in a separate more powerful processing device, i.e. the second image processing arrangement 100B, such as a smartphone as in the example of FIG. 7. The system 200 may be arranged to switch task and load new weights and/or other task parameters based on the task ID number as discussed above with reference to FIGS. 2 and 3. In FIG. 7 there is also shown that the first image processing arrangement 100A and the second image processing arrangement 100B comprises a task data database 760, possibly stored locally in the memory 102 of the image processing arrangement and/or stored remotely and accessible through the communication interface 103.

Returning to the method disclosed through the flowchart of FIG. 3 and discussed above, an image is received 310 and compressed 330 by being passed to the encoding network 710 and quantized (Q) into latent representation for encoding possibly through entropy encoding and 340 transmitted to the second image processing arrangement 100B through the encoder 720 (encoding the image for transmission) and received 345 by the decoder 730 (decoding the image after transmission) of the second image processing arrangement 100B, where the received image is passed to the object detection network 740 for performing 345 of the task that has been previously selected 320, and which task ID has also been previously communicated or communicated along with the image for proper selection and retrieval of task parameters based on the task ID by the first image processing arrangement 100A (320, 325) and by the second image processing arrangement 100B (350) respectively from the respective data bases 760 so that the second image processing arrangement 100B can process 355 the image properly to produce 360 the detection result. The detection results, or at least indications of them, are transmitted 370 to the first image processing arrangement 100A where they are received 380 and utilized 390.

In one embodiment, the encoding network 710 consists of at least one layer of Convolutional Neural Network (CNN), and at least one non-linear layer, e.g., Rectified Linear Units (ReLUs), Generalized Divisive Normalization (GDN). A down-sampling process can be performed in such an embodiment in the CNN operation by adjusting the stride. This has one benefit in that the parameter size is reduced and the bit rate is also reduced.

In one embodiment, the decoding network 740 is the inverse process of the encoding network 710, e.g., at least one layer of CNN and at least one non-linear layer. An up-sampling process can similarly be conducted in the CNN operation by adjusting the stride.

In one embodiment, the encoding network 710 and the decoding network 740 can take the form of autoencoders and variational autoencoders. This has a benefit in that it benefits from a proven performance of autoencoders and variational autoencoders in image compression, compared to the state-of-the-art conventional methods. In addition, these encoders can reconstruct images/parameters for a full image at once versus block-based conventional encoders. This also enable the end-to-end training In one embodiment, the quantization process Q is approximated with an addition of noise of uniform distribution during training, and the original quantization process is used during inference/encoding. This has a benefit in that the generalization of the end to end model is enhanced because introducing noise acts as a regularization mechanism.

In one embodiment, the bit rate of the compressed representation is approximated by the entropy. The density of the variables after the approximated quantization can be estimated with Non-parametric models, e.g. piece-wise smooth functions, or parametric models, e.g., a mixture of Laplacian model. The probability of the quantized variable is equal to an integral of the estimated density within the corresponding quantization bin. This has a benefit in that the process estimates the entropy of the source in an accurate way In one embodiment, the object detection network 740 can be a state-of-the-art object detector, e.g., YOLO (You Only Look Once), SSD (Single Shot MultiBox Detector), or faster R-CNN (Recursive Convolutional Neural Network).

In one embodiment, when the decoding network 740' and the objection detection network 740" are merged, the decoding network 740 is simplified. This simplification can be done by reducing the number of layers as well as number of filter channels.

In one embodiment, the detection accuracy loss, L, is a weighted sum of the confidence loss and the localization loss from the detected object class and its associated bounding box, respectively. This has a benefit in that it captures the contribution of loss from both classification and regression sub-tasks and the tradeoff for both the Loss from inference task and constraints.

In one embodiment, the distortion metric Mean Square Error MSE can be used to measure the distortion, D. This has a benefit of simplicity and wide adaptation in the community.

In one embodiment, the weighted parameters $\lambda 1$ and $\lambda 2$ are determined empirically. An increase of $\lambda 1$ enforces the reconstructed signal to resemble the original input signal.

In one embodiment, the entropy coding process utilizes an arithmetic encoder to produce the compressed bits. In another embodiment, the Content Adaptive Binary Arithmetical Coding (CABAC) can be applied to encode and decode the bit stream after binarization.

In one such embodiment, the task ID includes a field indicator identifying it as encrypted to allow systems combining bit streams with encrypted as well as open task IDs. In some embodiments, the encryption/decryption key is stored in both devices. In another embodiment, the bit stream is aimed for a specific decoder (second) image processing arrangement. In such systems, the ID might be encrypted with the second image processing arrangement's public key.

The invention claimed is:

1. A system comprising a first image processing arrangement and a second image processing arrangement, wherein the first image processing arrangement comprises a controller configured to:
  a) receive an image;
  b) select a task and a task identifier associated with task data;
  c) compress the image based on the task data; and
  d) transmit the compressed image to the second image processing arrangement for processing, and wherein the second image processing arrangement comprises a controller configured to:
  e) receive the compressed image and task identifier;
  f) retrieve task parameters associated with the task identifier;
  g) process the compressed image based on the task parameters;
  h) determine results and
  i) transmit the at least indications of the determined results to the first image processing arrangement, and the controller of the first image processing arrangement is further configured to:
  j) receive at least indications of a result of the processing from the second image processing arrangement; and
  k) indicate the result.

2. The image processing arrangement according to claim 1, wherein the image data file is in raw format.

3. The image processing arrangement according to claim 1, wherein the controller of the first image processing arrangement is further configured to b) select the task in communication with the controller of the second image processing arrangement and wherein the controller of the second image processing arrangement is further configured to select the task in communication with the controller of the first image processing arrangement.

4. The image processing arrangement according to claim 1, wherein the controller of the first image processing arrangement is further configured to c) compress the image utilizing a compressing neural network.

5. The image processing arrangement according to claim 1, wherein the controller of the second image processing arrangement is further configured to g) process the compressed image utilizing a processing neural network.

6. The image processing arrangement according to claim 5, wherein the processing neural network comprises a decompression neural network and a task performing neural network.

7. The image processing arrangement according to claim 4,
wherein the controller of the second image processing arrangement is further configured to g) process the compressed image utilizing a processing neural network, and
wherein the controller of the first image processing arrangement and the controller of the second image processing arrangement are further configured to train the compressing neural network and the processing neural network respectively end-to-end.

8. The image processing arrangement according to claim 7, wherein the controller of the first image processing arrangement and the controller of the second image processing arrangement are further configured to train the compressing neural network and the processing neural network respectively end-to-end by minimizing the bit rate and the task accuracy loss.

9. The image processing arrangement according to claim 7, wherein the controller of the first image processing arrangement and the controller of the second image processing arrangement are further configured to train the compressing neural network and the processing neural network respectively end-to-end by minimizing the distortion of the image, the bit rate and the task accuracy loss.

10. The image processing arrangement according to claim 1, wherein the processing is object detection.

11. The image processing arrangement according to claim 1, wherein the first image processing arrangement is an optical see-through device.

12. The image processing arrangement according to claim 1, wherein the second image processing arrangement is a smartphone or a computer.

13. The image processing arrangement according to claim 1, wherein the image processing arrangement is arranged to be used in image retrieval, industrial use, robotic vision and/or video surveillance.

14. A method for image processing in a system comprising a first image processing arrangement and a second image processing arrangement, wherein the method comprises in the first image processing arrangement:
a) receiving an image;
b) selecting a task and a task identifier associated with task data;
c) compressing the image based on the task data; and
d) transmitting the compressed image to the second image processing arrangement for processing, and wherein the method comprises in the second image processing arrangement:
e) receiving the compressed image and task identifier;
f) retrieving task parameters associated with the task identifier;
g) processing the compressed image based on the task parameters;
h) determining results and
i) transmitting the at least indications of the determined results to the first image processing arrangement, and the method further comprises in the first image processing arrangement:
j) receiving at least indications of a result of the processing from the second image processing arrangement; and
k) indicating the result.

15. An image processing arrangement for image processing in an image processing arrangement system comprising a first image processing arrangement and a second image processing arrangement, the image processing arrangement comprising circuitry for processing images comprising:
a) a circuitry for receiving an image in the first image processing arrangement;
b) a circuitry for selecting a task and a task identifier associated with task data in the first image processing arrangement;
c) a circuitry for compressing the image based on the task data in the first image processing arrangement; and
d) a circuitry for transmitting the compressed image to the second image processing arrangement for processing;
e) a circuitry for receiving the compressed image and task identifier in the second image processing arrangement;
f) a circuitry for retrieving task parameters associated with the task identifier in the second image processing arrangement;
g) a circuitry for processing the compressed image based on the task parameters in the second image processing arrangement;
h) a circuitry for determining results and
i) a circuitry for transmitting the at least indications of the determined results to the first image processing arrangement;
j) a circuitry for receiving at least indications of a result of the processing from the second image processing arrangement in the first image processing arrangement; and
k) a circuitry for indicating the result.

16. A first image processing arrangement comprising a controller configured to:
a) receive an image;
b) select a task and a task identifier associated with task data;
c) compress the image based on the task data; and
d) transmit the compressed image to the second image processing arrangement for processing;
j) receive at least indications of a result of the processing from the second image processing arrangement; and
k) indicate the result.

17. A method for image processing in a first image processing arrangement, said method comprising:
a) receiving an image;
b) selecting a task and a task identifier associated with task data;
c) compressing the image based on the task data; and
d) transmitting the compressed image to the second image processing arrangement for processing;
j) receiving at least indications of a result of the processing from the second image processing arrangement; and
k) indicating the result.

18. An arrangement comprising circuitry for image processing in a first image processing arrangement, said arrangement comprising circuitry comprising:
   a) a circuitry for receiving an image;
   b) a circuitry for selecting a task and a task identifier associated with task data;
   c) a circuitry for compressing the image based on the task data; and
   d) a circuitry for transmitting the compressed image to the second image processing arrangement for processing;
   j) a circuitry for receiving at least indications of a result of the processing from the second image processing arrangement; and
   k) a circuitry for indicating the result.

19. A second image processing arrangement comprising a controller configured to:
   e) receive a compressed image and a task identifier from a first image processing arrangement;
   f) retrieve task parameters associated with the task identifier;
   g) process the compressed image based on the task parameters;
   h) determine results; and
   i) transmit at least indications of the determined results to the first image processing arrangement.

20. A method for image processing in a second image processing arrangement, said method comprising:
   e) receiving a compressed image and a task identifier from a first image processing arrangement;
   f) retrieving task parameters associated with the task identifier;
   g) processing the compressed image based on the task parameters;
   h) determining results; and
   i) transmitting at least indications of the determined results to the first image processing arrangement.

21. An arrangement comprising circuitry for image processing in a second image processing arrangement, said arrangement comprising circuitry comprising:
   e) a circuitry for receiving a compressed image and a task identifier from a first image processing arrangement;
   f) a circuitry for retrieving task parameters associated with the task identifier;
   g) a circuitry for processing the compressed image based on the task parameters;
   h) a circuitry for determining results; and
   i) a circuitry for transmitting at least indications of the determined results to the first image processing arrangement.

22. A non-transitory computer-readable medium carrying computer instructions that when loaded into and executed by a controller of an image processing arrangement enables the image processing arrangement to implement a method for image processing in a system comprising a first image processing arrangement and a second image processing arrangement, wherein the method comprises in the first image processing arrangement:
   a) receiving an image;
   b) selecting a task and a task identifier associated with task data;
   c) compressing the image based on the task data; and
   d) transmitting the compressed image to the second image processing arrangement for processing, and wherein the method comprises in the second image processing arrangement:
   e) receiving the compressed image and task identifier;
   f) retrieving task parameters associated with the task identifier;
   g) processing the compressed image based on the task parameters;
   h) determining results and
   i) transmitting the at least indications of the determined results to the first image processing arrangement, and the method further comprises in the first image processing arrangement:
   j) receiving at least indications of a result of the processing from the second image processing arrangement; and
   k) indicating the result.

23. A non-transitory computer-readable medium carrying computer instructions that when loaded into and executed by a controller of an image processing arrangement enables the image processing arrangement to implement a method for image processing in a first image processing arrangement, said method comprising:
   a) receiving an image;
   b) selecting a task and a task identifier associated with task data;
   c) compressing the image based on the task data; and
   d) transmitting the compressed image to the second image processing arrangement for processing;
   j) receiving at least indications of a result of the processing from the second image processing arrangement; and
   k) indicating the result.

24. A non-transitory computer-readable medium carrying computer instructions that when loaded into and executed by a controller of an image processing arrangement enables the image processing arrangement to implement a method for image processing in a second image processing arrangement, said method comprising:
   e) receiving a compressed image and a task identifier from a first image processing arrangement;
   f) retrieving task parameters associated with the task identifier;
   g) processing the compressed image based on the task parameters;
   h) determining results; and
   i) transmitting at least indications of the determined results to the first image processing arrangement.

* * * * *